United States Patent
Kubota et al.

(10) Patent No.: US 9,453,973 B2
(45) Date of Patent: Sep. 27, 2016

(54) FABRICATION METHOD FOR OPTICAL CONNECTOR AND OPTICAL CONNECTOR

(71) Applicant: FUJITSU LIMITED, Kawasaki-shi, Kanagawa (JP)

(72) Inventors: Takashi Kubota, Chikuma (JP); Norio Kainuma, Nagano (JP); Sanae Iijima, Nagano (JP); Hidehiko Kira, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/675,822

(22) Filed: Apr. 1, 2015

(65) Prior Publication Data
US 2015/0346434 A1    Dec. 3, 2015

(30) Foreign Application Priority Data
May 30, 2014   (JP) .................. 2014-113545

(51) Int. Cl.
*G02B 6/36*   (2006.01)
*G02B 6/38*   (2006.01)

(52) U.S. Cl.
CPC ........... *G02B 6/3855* (2013.01); *G02B 6/3885* (2013.01); *G02B 6/3838* (2013.01); *G02B 6/3853* (2013.01); *Y10T 29/49828* (2015.01)

(58) Field of Classification Search
None
See application file for complete search history.

(56) References Cited

U.S. PATENT DOCUMENTS

| | | | | |
|---|---|---|---|---|
| 9,250,397 B2* | 2/2016 | Akabane | ............... | G02B 6/3874 |
| 2012/0033920 A1* | 2/2012 | Haley | ................. | G02B 6/3834 |
| | | | | 385/78 |
| 2013/0136399 A1* | 5/2013 | Jubin | .................. | G02B 6/3676 |
| | | | | 385/78 |
| 2015/0346434 A1* | 12/2015 | Kubota | ............... | G02B 6/3855 |
| | | | | 385/79 |

FOREIGN PATENT DOCUMENTS

| | | |
|---|---|---|
| JP | 2006-17914 | 1/2006 |
| JP | 2006-349861 | 12/2006 |

\* cited by examiner

*Primary Examiner* — Rhonda Peace
(74) *Attorney, Agent, or Firm* — Staas & Halsey LLP

(57) ABSTRACT

A fabrication method for an optical connector, includes: inserting an optical waveguide sheet, in a direction of an optical path of the optical waveguide sheet, into an insertion hole of an optical connector including lenses disposed in a juxtaposed relationship on a first end face of the optical connector, the insertion hole extending from a second end face of the optical connector at an opposite side to the first end face toward the lenses; and performing first adjustment of adjusting a position of a tip end of the optical path with respect to the lenses by pressing a side end portion of the optical waveguide sheet inserted in the insertion hole from at least one of sides of a first direction along a disposition direction of the lenses, through a first hole portion that is provided in the optical connector and extends to the insertion hole.

15 Claims, 13 Drawing Sheets

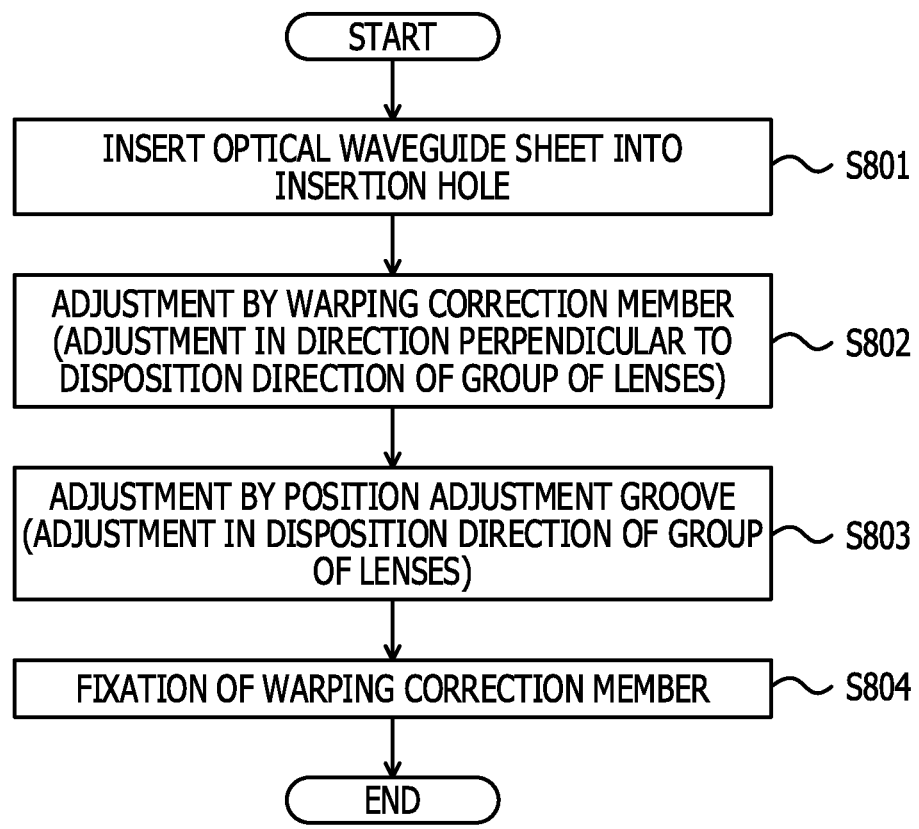

FABRICATION METHOD FOR OPTICAL CONNECTOR AND OPTICAL CONNECTOR

CROSS-REFERENCE TO RELATED APPLICATION

This application is based upon and claims the benefit of priority from the prior Japanese Patent Application No. 2014-113545 filed on May 30, 2014, the entire contents of which are incorporated herein by reference.

FIELD

The embodiment discussed herein is related to a fabrication method for an optical connector and an optical connector.

BACKGROUND

In fabrication of an optical connector, an optical waveguide sheet is mounted on an optical connector by being inserted into an insertion hole provided in the optical connector. Optical axes of a plurality of lenses provided in the optical connector and each of optical paths of the optical waveguide sheet which individually correspond to the lenses are aligned with each other so that the mounting accuracy (optical axis accuracy) between the optical connector and the optical waveguide sheet has a value equal to or higher than a given value.

A related art is disclosed in Japanese Laid-open Patent Publication No. 2006-017914 or Japanese Laid-open Patent Publication No. 2006-349861.

SUMMARY

According to an aspect of the embodiments, a fabrication method for an optical connector, includes: inserting an optical waveguide sheet, in a direction of an optical path of the optical waveguide sheet, into an insertion hole of an optical connector including lenses disposed in a juxtaposed relationship on a first end face of the optical connector, the insertion hole extending from a second end face of the optical connector at an opposite side to the first end face toward the lenses; and performing first adjustment of adjusting a position of a tip end of the optical path with respect to the lenses by pressing a side end portion of the optical waveguide sheet inserted in the insertion hole from at least one of sides of a first direction along a disposition direction of the lenses, through a first hole portion that is provided in the optical connector and extends to the insertion hole.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 depicts an example of a fabrication method for an optical connector.

DESCRIPTION OF EMBODIMENTS

For example, a mechanism in which an optical fiber is held down by a block-like cover is available. For example, warping of a waveguide sheet is reduced by a supporting board.

Since an optical waveguide sheet has a thin film structure, warping may occur in the optical waveguide sheet. If a warped optical waveguide sheet is mounted on an optical connector, displacement may possibly occur between lens positions of the optical connector and optical path positions of the optical waveguide sheet. For example, if the dimensional accuracy of the optical waveguide sheet and the working accuracy of insertion openings of the optical connector do not exhibit designed values, optical axis displacement, for example, optical axis displacement in a horizontal direction of the optical waveguide sheet, may occur upon mounting of the optical waveguide sheet. By such optical axis displacement, coupling loss equal to or more than supposed loss may occur, resulting in failure of the optical connector.

Figure 1:
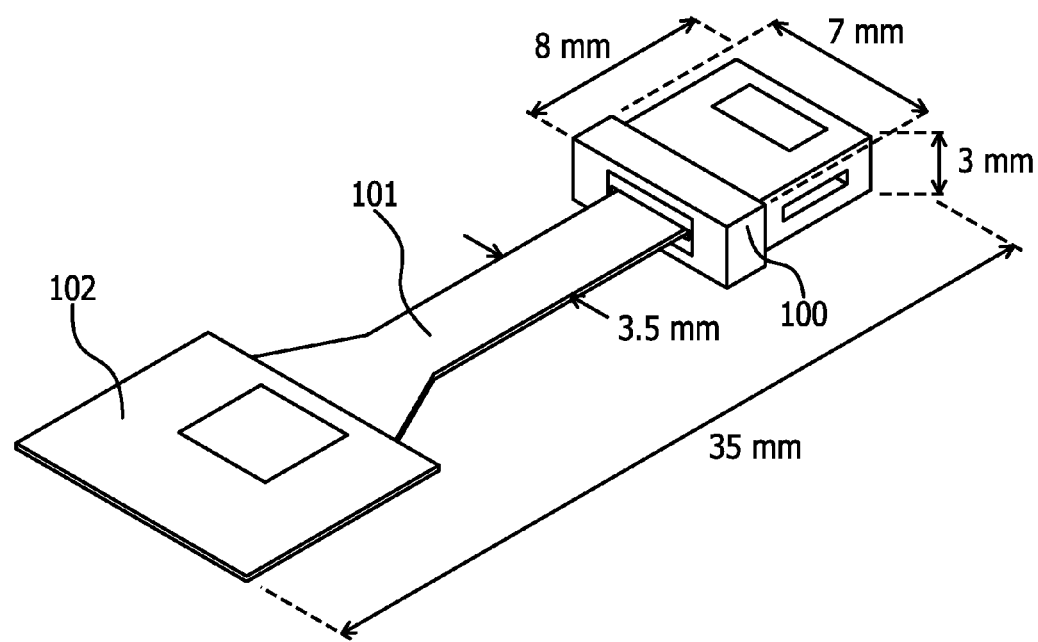
FIG. 1 depicts an example of an optical connector and peripheral elements.

FIG. 1 depicts an example of an optical connector and peripheral elements. Referring to FIG. 1, an optical connector 100, an optical waveguide sheet 101 and an optical module 102 are depicted. FIG. 1 depicts a state in which the optical connector 100 and the optical module 102 are coupled to each other by the optical waveguide sheet 101. The optical waveguide sheet 101 is coupled to the optical connector 100 such that the optical waveguide sheet 101 is inserted at one end thereof in an insertion hole of the optical connector 100, for example, in an insertion hole 401 depicted in FIG. 4.

The optical connector 100 depicted in FIG. 1 may have, for example, a longitudinal dimension of approximately 8 mm, a lateral dimension of approximately 7 mm and a heightwise dimension of approximately 3 mm. In the following description, a direction in which the optical waveguide sheet 101 is inserted into the optical connector 100 is referred to as "longitudinal" direction; a direction perpendicular to the direction in which the optical waveguide sheet 101 is inserted into the optical connector 100 is referred to as "lateral" direction; and a direction indicative of a thickness of the optical connector 100 is referred to as "heightwise" direction. The optical connector 100 may have arbitrary dimensions. The optical connector 100 may include a material such as cyclo-olefin polymer or a like material.

The optical module 102 may have a rectangular shape of, for example, approximately 10.5 mm×approximately 13.5 mm. The overall length in the longitudinal direction of a finished product configured from the optical connector 100 and the optical module 102 coupled to each other may be, for example, approximately 35 mm. The width of the optical waveguide sheet 101 on the side at which the optical waveguide sheet 101 is coupled to the optical connector 100 may be, for example, approximately 3.5 mm. However, the dimensions of the optical module 102 may be set arbitrarily in accordance with an application of the optical module 102. The surface of the optical waveguide sheet 101 may include a material such as polynorbornene resin, fluorinated polyimide resin/polyimide resin or the like.

Figure 2:
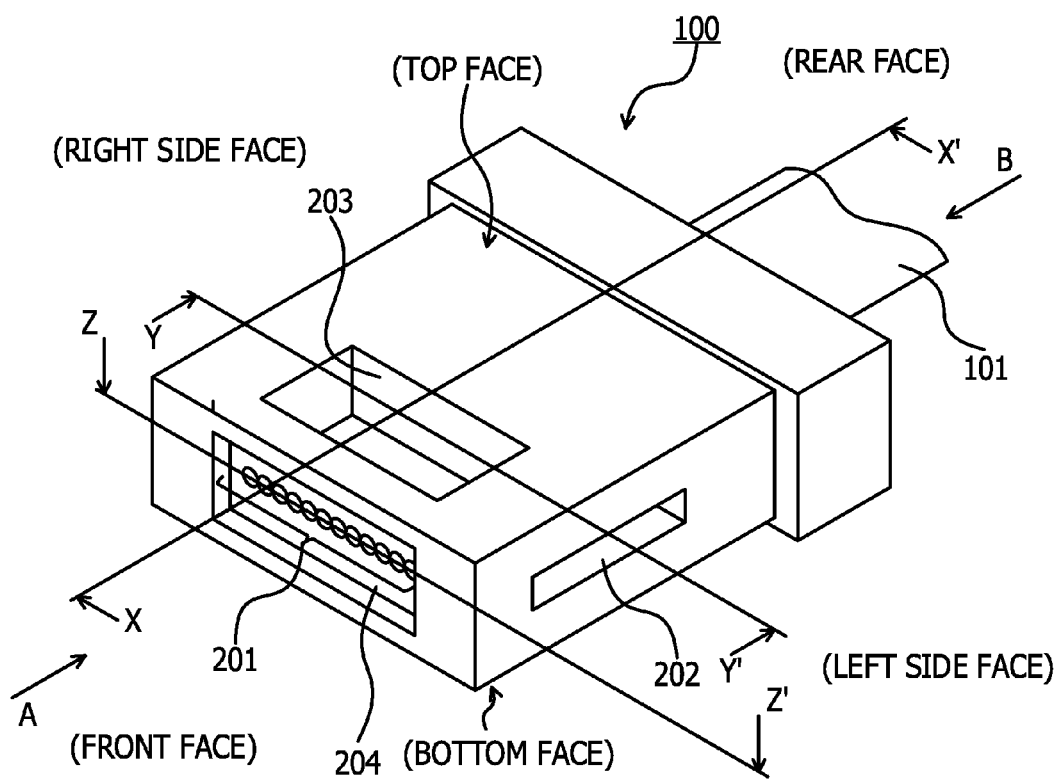
FIG. 2 depicts an example of a structure of an optical connector.
Figure 3:
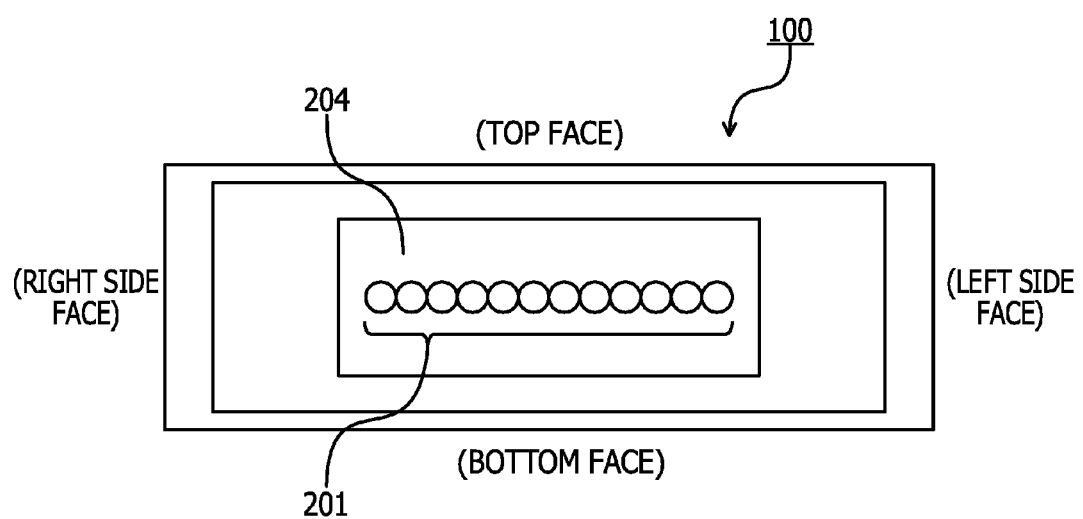
FIG. 3 depicts an example of an optical connector.
Figure 4:
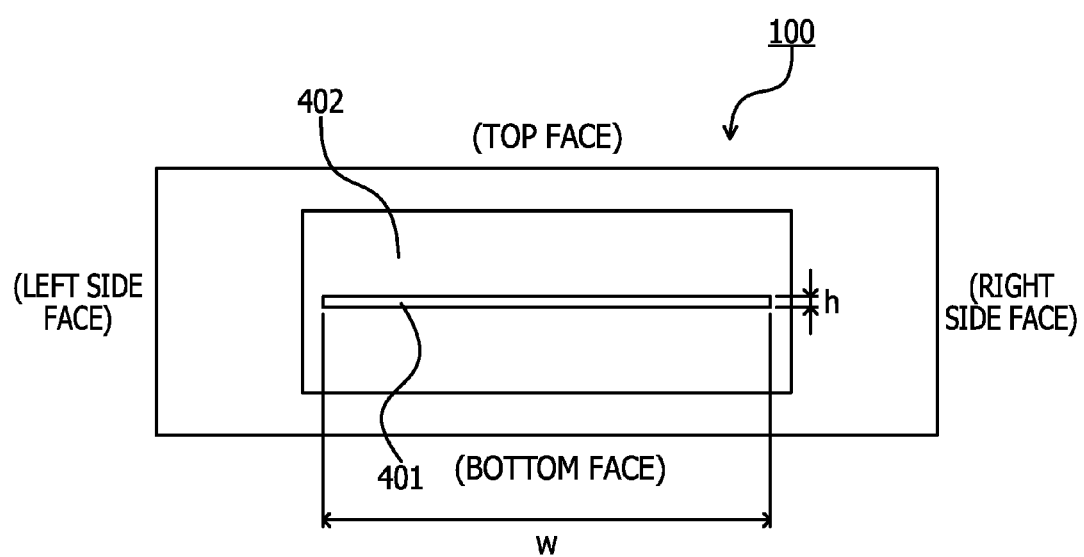
FIG. 4 depicts an example of an optical connector.

FIG. 2 depicts an example of a structure of an optical connector. The optical connector depicted in FIG. 2 may be the optical connector 100 depicted in FIG. 1. FIG. 3 depicts an example of an optical connector. In FIG. 3, the optical connector 100 as viewed from the direction indicated by an arrow mark A of FIG. 2 is depicted. In the following description, a face of the optical connector 100 as viewed in the direction indicated by the arrow mark A is referred to as "front face" of the optical connector 100. FIG. 4 depicts an example of an optical connector. In FIG. 4, the optical connector 100 as viewed from the direction indicated by an arrow mark B of FIG. 2 is depicted. In the following description, a face of the optical connector 100 as viewed from the direction indicated by the arrow mark B is referred to as "rear face" of the optical connector 100.

The optical connector 100 depicted in FIG. 2 includes a group of lenses 201 provided on the front face of the optical connector 100, a position adjustment groove 202 provided on a side face of the optical connector 100, and a warping correction member insertion hole 203 provided on an upper face of the optical connector 100. In the following description, the face of the optical connector 100 on which the position adjustment groove 202 depicted in FIG. 2 is provided is referred to as "left side face." The face of the optical connector 100 on which the warping correction member insertion hole 203 is provided is referred to as "top face," and the opposite face of the optical connector 100 opposing to the top face is referred to as "bottom face."

The insertion hole 401 is provided on the rear face of the optical connector 100. Also on a side face of the optical connector 100 at the opposite side to the left side face (the side face at the opposite side is hereinafter referred to as "right side face"), another position adjustment groove 202 is provided similarly to the left side face. The position adjustment groove 202 provided on the left side face and the position adjustment groove 202 provided on the right side face may have a substantially same shape and a substantially same size. The position adjustment groove 202 provided on the left side face and the position adjustment groove 202 provided on the right side face may have shapes different from each other or may have sizes different from each other.

In FIG. 3, the front face of the optical connector 100 is depicted. In FIG. 3, the left side indicates the right side face of the optical connector 100 and the right side indicates the left side face of the optical connector 100. The front face of the optical connector 100 may be a face to which a different optical connector is coupled. On the front face of the optical connector 100, the group of lenses 201 from which optical signals are output to the different optical connector is provided.

As depicted in FIGS. 2 and 3, the group of lenses 201 includes, for example, 12 lenses. The number of lenses is not limited to 12 but may be selected arbitrarily. The 12 lenses are disposed in a juxtaposed relationship in a row, for example, in the lateral direction (horizontal direction) of the optical connector 100 depicted in FIG. 3. In the group of lenses 201, the 12 lenses may be formed, for example, by integral formation.

A grooved portion 204 is provided at a substantially central location of the front face of the optical connector 100, and the group of lenses 201 is disposed in an embedded state inside the grooved portion 204. The grooved portion 204 may have such a shape as depicted, for example, in FIG. 5 or in FIG. 7. As depicted in FIG. 3, the group of lenses 201 may be disposed at a central location of the optical connector 100 in the lateral direction and the heightwise direction.

In FIG. 4, the rear face of the optical connector 100 is depicted. In FIG. 4, the left side indicates the left side face of the optical connector 100 and the right side indicates the right side face of the optical connector 100. The optical waveguide sheet 101 is inserted into the insertion hole 401 through an entrance of the insertion hole 401. The insertion hole 401 has a size a little greater than the size of the optical waveguide sheet 101 so that the optical waveguide sheet 101 may be inserted into the insertion hole 401 easily. For example, the lateral width "w" of the insertion hole 401 may be a little greater than approximately 3.5 mm that is the dimension of the width "W" of the optical waveguide sheet 101 (w>W), and the height "h" of the insertion hole 401 may be a little greater than the thickness "H" of the optical waveguide sheet 101 (h>H).

In the proximity of the entrance of the insertion hole 401, a member 402 called "boot" is embedded which includes a material different from the material of the other portion of the optical connector 100. The material of the member 402 may be a material that is softer than the material of the other portion of the optical connector 100 such as rubber or resin so that a tip end portion of the optical waveguide sheet 101 may not be damaged when the optical waveguide sheet 101 is inserted into the insertion hole 401, or so that, after the optical waveguide sheet 101 is inserted into the insertion hole 401, the stress of the optical waveguide sheet 101 in the proximity of the insertion hole 401 may be mitigated to reduce the possibility of damage to the optical waveguide sheet 101.

Figure 5:
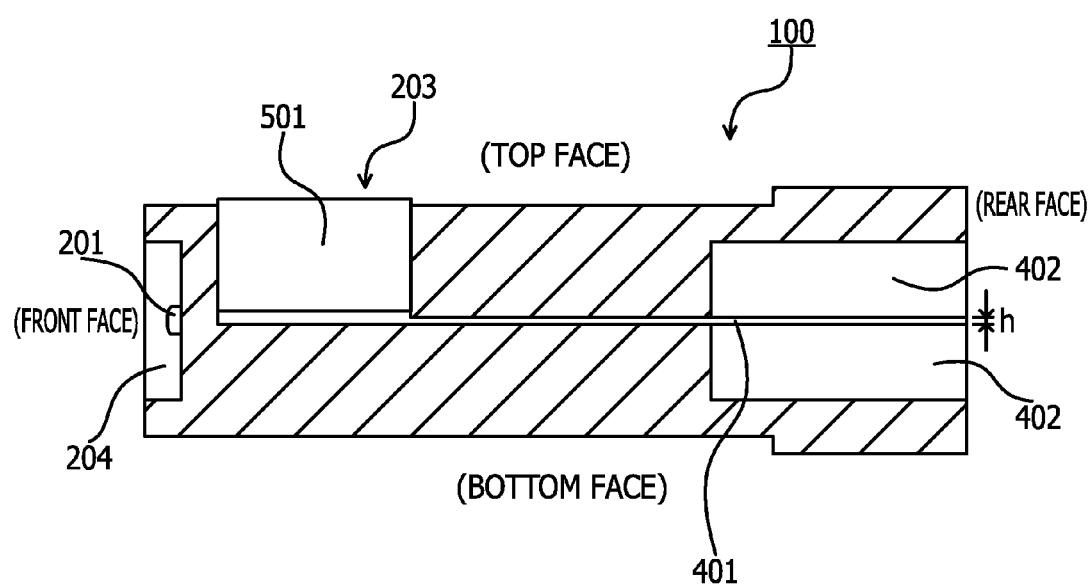
FIG. 5 depicts an example of a cross section of an optical connector.

FIG. 5 depicts an example of a cross section of an optical connector. In FIG. 5, a cross section taken along line X-X' of the optical connector depicted in FIG. 2 is depicted. 1. In FIG. 5, the left side indicates the front face of the optical connector 100, and the right side indicates the rear face of the optical connector 100. As depicted in FIG. 5, the insertion hole 401 extends in a horizontal direction from the rear face side toward the front face side of the optical connector 100 while the insertion hole 401 keeps the height "h,", and a deepest portion of the insertion hole 401 reaches the group of lenses 201 provided at the front face side of the optical connector 100. The member 402 ("boot") may correspond to a region of the insertion hole 401 from the entrance to an intermediate portion of the insertion hole 401.

In FIG. 5, in the optical connector 100, the warping correction member insertion hole 203 is disposed in the proximity of the deepest portion of the insertion hole 401 and extends from the top face of the optical connector 100 to the insertion hole 401. A warping correction member 501 is inserted in the warping correction member insertion hole 203. By the configuration just described, the warping correction member 501 abuts with the tip end portion of the optical waveguide sheet 101 inserted in the insertion hole 401. By pressing the warping correction member 501 down from above toward the bottom face side of the optical connector 100, a lower side face of the warping correction member 501 is abutted with a portion in the proximity of the tip end portion of the optical waveguide sheet 101 inserted in the insertion hole 401 to the deepest portion. Further, the portion in the proximity of the tip end portion of the optical waveguide sheet 101 may be pressed by the warping correction member 501 and sandwiched between the warping correction member 501 and a lower side portion of the insertion hole 401 so that the optical waveguide sheet 101 is corrected from warping.

The warping correction member 501 may have a substantially same shape as the shape of the warping correction member insertion hole 203 and may have a size a little smaller than the size of the warping correction member insertion hole 203. Therefore, the warping correction member 501 may be inserted readily into the warping correction member insertion hole 203, and the tip end portion of the optical waveguide sheet 101 with which the inserted warping correction member 501 is abutted may be pressed down readily. The warping correction member 501 may include a material such as cyclo-olefin polymer or the like similarly to the optical connector 100. The warping correction member 501 may be fabricated from a material which is the same as the material of the optical connector 100 or may be fabricated otherwise from a different material.

Figure 6:
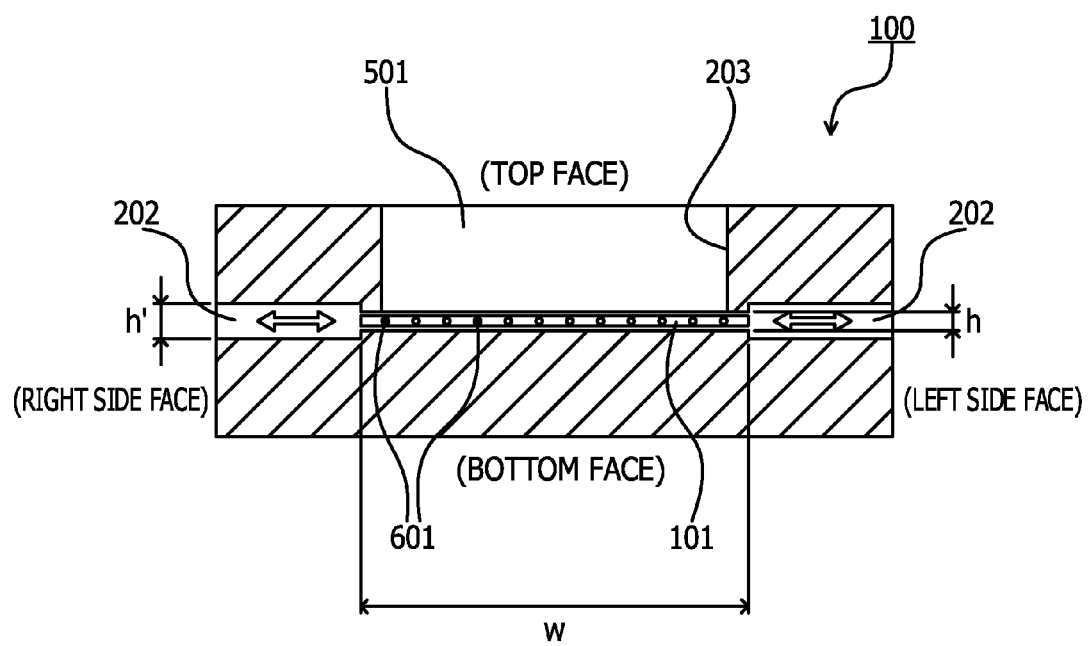
FIG. 6 depicts an example of a cross section of an optical connector.

FIG. 6 depicts an example of a cross section of an optical connector. In FIG. 6, a cross section taken along line Y-Y' of the optical connector depicted in FIG. 2 is depicted. Since FIG. 6 is the cross sectional view taken along line Y-Y' of the optical connector 100 as viewed from the direction indicated by the arrow mark A of FIG. 2, the left side indicates the right side face of the optical connector 100 and the right side indicates the left side face of the optical connector 100 in FIG. 6.

In FIG. 6, the lateral width of the insertion hole 401 keeps "w" of the entrance of the insertion hole 401. In FIG. 6, a state is depicted in which the optical waveguide sheet 101 is inserted in the insertion hole 401 having the lateral width of "w." On the optical waveguide sheet 101, 12 optical paths 601 are provided in a line in the lateral widthwise direction. The optical paths 601 may individually correspond to the positions of the 12 lenses of the group of lenses 201 depicted in FIG. 3 and so forth.

In FIG. 6, the lateral width of the warping correction member insertion hole 203 is set smaller than the lateral width "w" of the insertion hole 401. The lateral width of the warping correction member insertion hole 203 may be set equal to the lateral width "w" of the insertion hole 401 or may be set greater than the lateral width "w" of the insertion hole 401.

In FIG. 6, the position adjustment grooves 202 are provided on extension lines of the insertion hole 401 on the right side face and the left side face of the optical connector 100 and pass through to the insertion hole 401. In FIG. 6, the height "h" of the position adjustment grooves 202 on the right side face and on the left side face is greater than the height "h" of the insertion hole 401 (h'>h). The height "h" of the position adjustment grooves 202 on the right side face and on the left side face may be substantially equal to or smaller than the height "h" of the insertion hole 401.

Holding jigs are inserted through the position adjustment grooves 202 on the right side face and on the left side face and abutted with side end portions of the optical waveguide sheet 101. By pressing the holding jigs on the right side face and on the left side face while adjusting the holding jigs on the right side face and on the left side face with each other, adjustment of the position in the lateral direction of the optical waveguide sheet 101 inserted in the insertion hole 401 is performed.

Figure 7:
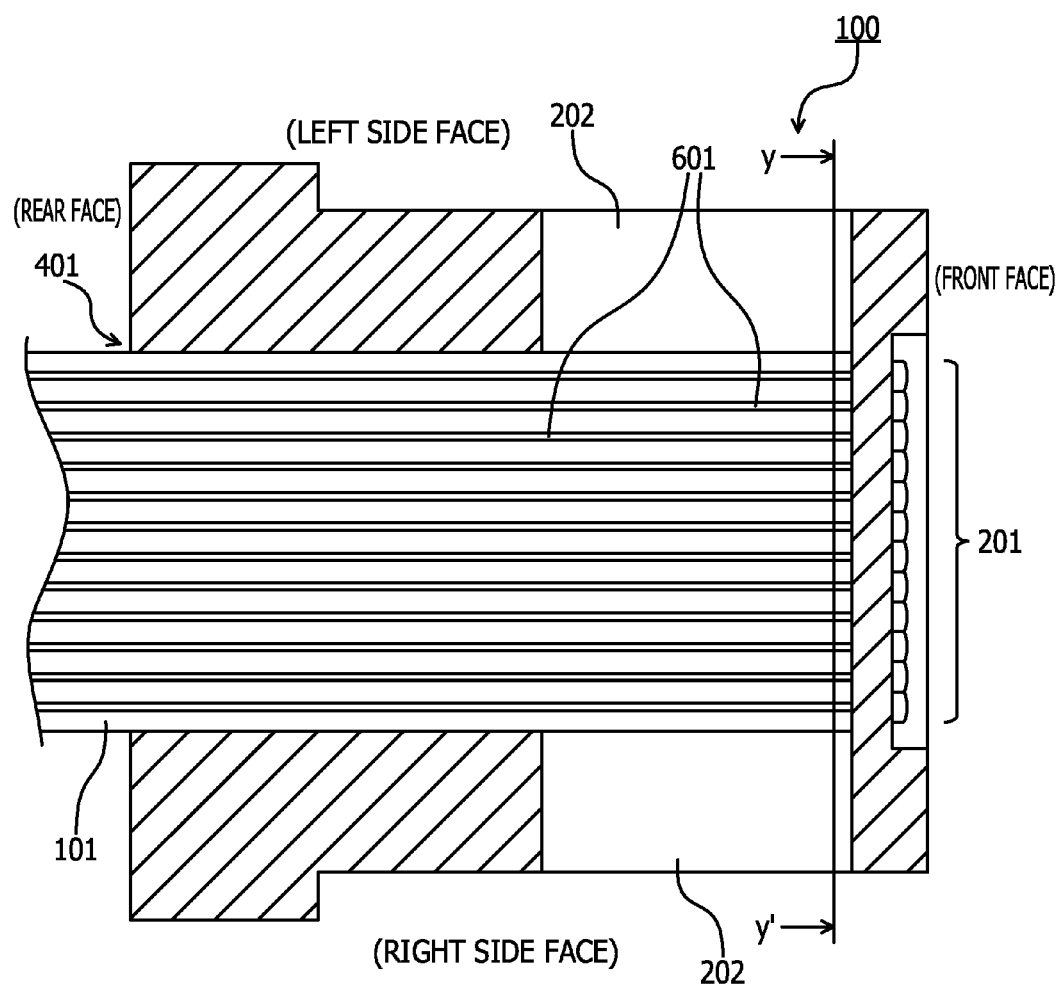
FIG. 7 depicts an example of a cross section of an optical connector.

FIG. 7 depicts an example of a cross section of an optical connector. In FIG. 7, a cross section taken along line Z-Z' of the optical connector depicted in FIG. 2 is depicted. Since FIG. 7 is a cross sectional view taken along line Z-Z' of the optical connector 100 depicted in FIG. 2 as viewed from above, the right side in FIG. 7 indicates the front face of the optical connector 100 and the left side in FIG. 7 indicates the rear face of the optical connector 100 while the upper side indicates the left side face and the lower side indicates the right side face.

In FIG. 7, the optical waveguide sheet 101 is depicted in an inserted state. As depicted in FIG. 7, the 12 optical paths 601 are provided in parallel to each other on the optical waveguide sheet 101 so as to extend in the longitudinal direction (insertion direction) of the optical waveguide sheet 101. The distance between the 12 optical paths 601 may correspond to the distance from the center of each of the 12 lenses of the group of lenses 201 to the center of an adjacent one of the lenses.

In FIG. 7, the position adjustment grooves 202 pass through from the left and right side faces of the optical connector 100 to the insertion hole 401. Holding jigs are inserted toward side end portions of the optical waveguide sheet 101 through the position adjustment grooves 202 and abutted with the side end portions of the optical waveguide sheet 101.

The shape and the size of the warping correction member insertion hole 203 are not limited to the shape and the size depicted in FIGS. 2, 5 and 6 but may be set arbitrarily. The shape of the warping correction member insertion hole 203 may be a rectangular shape or some other shape. The size of the warping correction member insertion hole 203 may be greater or smaller than the size depicted in FIGS. 2, 5 and 6. The warping correction member insertion hole 203 may extend at least to one of the front face and the rear face of the optical connector 100. Also the size of the position adjustment grooves 202 may be greater or smaller than the size depicted in FIGS. 2, 6 and 7. Further, the position adjustment grooves 202 may extend to at least one of the front face and the rear face of the optical connector 100.

FIG. 8 depicts an example of a fabrication method for an optical connector. Referring to FIG. 8, the optical waveguide sheet 101 is inserted into the insertion hole 401 of the optical connector 100 (operation S801). The insertion of the optical waveguide sheet 101 into the insertion hole 401 of the optical connector 100 is performed until the tip end portion of the optical waveguide sheet 101 is brought into abutment with a deepest portion of the insertion hole 401. The insertion work of the optical waveguide sheet 101 into the optical connector 100 may be performed manually by a worker.

Adjustment of the optical waveguide sheet 101 in a direction perpendicular to the arrangement direction of the group of lenses 201 is performed by the warping correction member 501 (operation S802). For example, the warping correction member 501 is moved in a direction perpendicular to the arrangement direction of the group of lenses 201, for example, in an upward and downward direction (vertical direction) in FIG. 6. By the movement of the warping correction member 501, warping of the optical waveguide sheet 101 inserted in the insertion hole 401 is corrected with reference to the lower face of the optical waveguide sheet 101. Thereupon, the adjustment may be performed while the optical coupling state between the optical connector 100 and the optical waveguide sheet 101 is checked.

The movement in the upward and downward direction of the warping correction member 501 may be performed using a given adjustment apparatus or manually by a worker. For example, the warping correction member 501 may be pressed down by a pressure of such a degree that the optical waveguide sheet 101 is not broken. For example, warping of the optical waveguide sheet 101 may be corrected by the pressure provided by the own weight of the warping correction member 501.

Figure 9A:
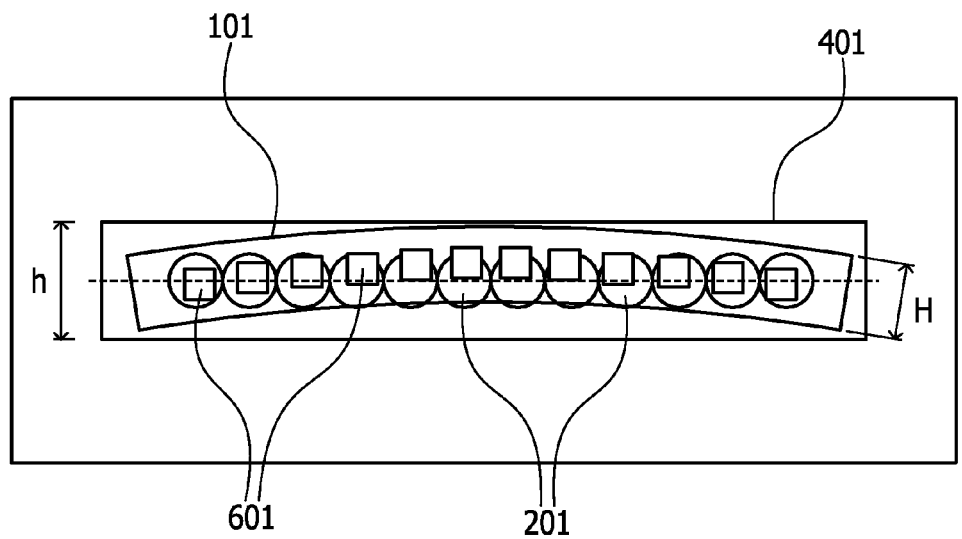
FIGS. 9A and 9B depict an example of displacement between a group of lenses and optical paths of an optical waveguide sheet.

FIG. 9A depicts an example of displacement between a group of lenses and optical paths of an optical waveguide sheet. In FIG. 9A, a cross section taken along line y-y' of the optical connector depicted in FIG. 7 is depicted. In FIG. 9A, a lens is indicated by a circle, and the optical path 601 of the optical waveguide sheet 101 is indicated by a quadrangle. In FIG. 9A, a stated is depicted in which a central portion of the optical waveguide sheet 101 inserted in the insertion hole 401 in the lateral widthwise direction is warped to the upper side in the insertion hole 401. From among the optical paths 601, optical paths around a central location are displaced from the center of the lenses and warped to the upper side. Therefore, optical axis displacement occurs with the optical paths 601 in the proximity of the central location.

If the height "h" of the insertion hole 401 is set closer to the height "H" of the optical waveguide sheet 101, the warping described hereinabove may decrease. If the height "h" of the insertion hole 401 is set closer to the height "H" of the optical waveguide sheet 101, insertion of the optical waveguide sheet 101 into the insertion hole 401 may become difficult. Upon insertion, the optical waveguide sheet 101 may be damaged. Therefore, it may be better that h>H is satisfied. Further, from a shape or a material of the optical waveguide sheet 101, the optical waveguide sheet 101 inserted in the insertion hole 401 may be warped in the insertion hole 401 due to a dispersion in size of the optical waveguide sheet 101, a dispersion in size of the insertion hole 401 and so forth.

In the operation S802 depicted in FIG. 8, warping of the optical waveguide sheet 101 is eliminated using the warping correction member 501. In FIG. 9A, a state is depicted in which the optical waveguide sheet 101 is warped to the upper side at a middle portion thereof. Also in a state in which the optical waveguide sheet 101 is warped to the lower side reversely to the state in FIG. 9A or in a state the optical waveguide sheet 101 is warped in a wavelike fashion, the warping of the optical waveguide sheet 101 may be eliminated using the warping correction member 501.

In FIG. 8, adjustment of the optical waveguide sheet 101 in the arrangement direction of the group of lenses 201 through the position adjustment groove 202 is performed (operation S803). In the adjustment method, holding jigs or the like are inserted from the position adjustment grooves 202 on the right side face and on the left side face until the holding jigs or the like are brought into abutment with side end portions of the optical waveguide sheet 101 as described hereinabove. While the left and right holding jigs are adjusted relative to each other, pressing of the optical waveguide sheet 101 is performed to perform adjustment of the position in the lateral direction of the optical waveguide sheet 101 inserted in the insertion hole 401. The adjustment may be performed while the optical coupling state between the optical connector 100 and the optical waveguide sheet 101 is checked. The adjustment may be performed manually by a worker or may be performed using an adjustment apparatus depicted in FIG. 10.

Figure 9B:
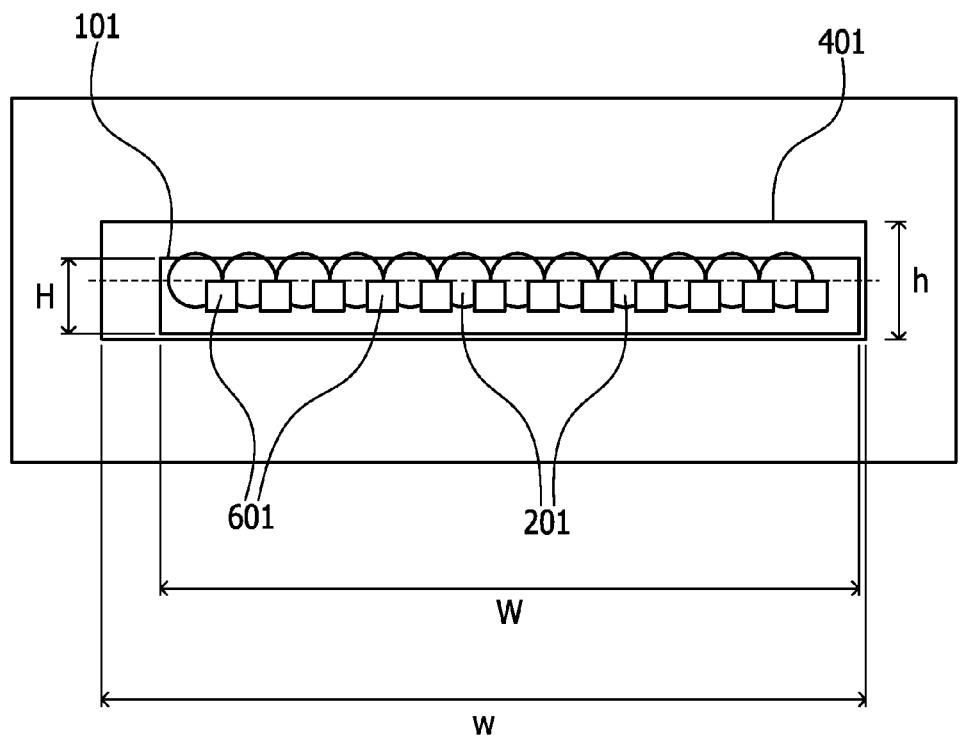

FIG. 9B depicts an example of displacement between a group of lenses and optical paths of an optical waveguide sheet. In FIG. 9B, a cross section taken along line y-y' of the optical connector depicted in FIG. 7 is depicted. Also in FIG. 9B, a lens is indicated by a circle and an optical path 601 of the optical waveguide sheet 101 is indicated by a rectangle similarly as in FIG. 9A. In FIG. 9B, warping of the optical waveguide sheet 101 inserted in the insertion hole 401 is eliminated. However, the optical waveguide sheet 101 is displaced in the lateral widthwise direction. The optical waveguide sheet 101 is displaced to the right side in FIG. 9B and the optical paths 601 are moved to positions displaced from the positions of the corresponding lenses. Therefore, an optical axis displacement of the optical paths 601 entirely occurs.

If the lateral width "w" of the insertion hole 401 is set closer to the width "W" of the optical waveguide sheet 101, such displacement as described above may decrease. If the lateral width "w" of the insertion hole 401 is set closer to the width "W" of the optical waveguide sheet 101, the insertion of the optical waveguide sheet 101 into the insertion hole 401 may become difficult, or the optical waveguide sheet 101 may be damaged upon insertion thereof. Therefore, it may be desirable that w>W is satisfied. Besides, the optical waveguide sheet 101 inserted in the insertion hole 401 may be displaced in the insertion hole 401 by a dispersion of the size of the optical waveguide sheet 101, a dispersion of the size of the insertion hole 401 and so forth. Therefore, in the operation S803 depicted in FIG. 8, the displacement in the lateral direction of the optical waveguide sheet 101 may be eliminated through the position adjustment groove 202.

In the operation S802, adjustment by the warping correction member 501 is performed to correct warping of the optical waveguide sheet 101, and the warping correction member 501 is fixed provisionally. In the provisional fixation, the pressure may be controlled to 0.1 MPa or less so that the optical waveguide sheet 101 may not be collapsed. It may be efficient and more effective that the displacement of the optical waveguide sheet 101 in the lateral direction is adjusted by adjustment through the position adjustment groove 202 in the operation S803. The warping correction member 501 and the optical waveguide sheet 101 are structured such that, in the provisionally fixed state, the warping correction member 501 and the optical waveguide sheet 101 slip relative to each other. Therefore, while the optical coupling state between the optical connector 100 and the optical waveguide sheet 101 is checked, the position of the optical waveguide sheet 101 may be adjusted using the position adjustment grooves 202 on the right side face and on the left side face.

The warping correction member 501 is fixed to the optical connector 100 using, for example, an ultraviolet (UV) bonding agent or the like in the form of liquid (operation S804). The coupling process between the optical connector 100 and the optical waveguide sheet 101 including the position adjustment of the optical paths 601 of the optical waveguide sheet 101 and the group of lenses 201 is completed therewith, and the processing advances to a next process.

Figure 10:
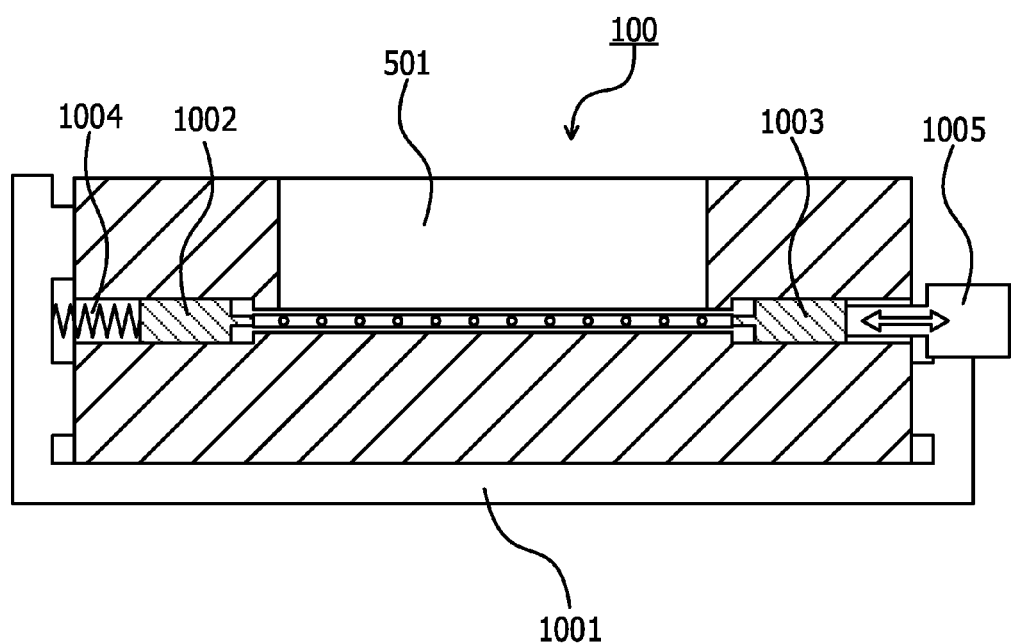
FIG. 10 depicts an example of an adjustment table.

FIG. 10 depicts an example of an adjustment table. In FIG. 10, a cross section taken along line Y-Y' of the optical connector depicted in FIG. 2 and a configuration of the adjustment table are depicted. FIG. 10 illustrates a state in which the optical connector 100 having the optical waveguide sheet 101 inserted in the insertion hole 401 is placed on the adjustment table 1001. When the optical connector 100 is placed on the adjustment table 1001, a holding jig 1002 and a spring mechanism 1004 that has elastic force are set in the position adjustment groove 202 at one side (at the left side in FIG. 10). In the other position adjustment groove 202, another holding jig 1003 is set. An adjustment mechanism 1005 is set to the holding jig 1003 side.

The adjustment mechanism 1005 moves the holding jig 1003 to the optical waveguide sheet 101 side, for example, from the right side to the left side in a horizontal direction in FIG. 10 while adjusting the pressure for pressing. The holding jig 1003 presses a side end portion of the optical waveguide sheet 101 such that the optical waveguide sheet 101 is moved to an optimum position by antagonism with the repulsive force of the holding jig 1002, which abuts with a side end portion of the optical waveguide sheet 101 at the opposite side, and the spring mechanism 1004. The adjustment mechanism 1005 may be configured using, for example, a micro motor or the like.

The position adjustment of the optical waveguide sheet 101 is performed using the force of the adjustment mechanism 1005 and the force of the spring mechanism 1004 while loss data of the optical coupling state between the optical connector 100 and the optical waveguide sheet 101 is checked. In a state in which the position adjustment is completed and the holding jigs 1002 and 1003 are left in the position adjustment grooves 202, for example, UV bonding agent or the like in the form of liquid is poured into the insertion hole 401 and solidified together with the holding jigs 1002 and 1003 to fix the optical waveguide sheet 101. The spring mechanism 1004 may be removed when UV bonding agent in the form of liquid is poured. By using the adjustment table 1001 including the adjustment mechanism 1005 in this manner, more efficient and more accurate adjustment may be performed.

According to the fabrication method for an optical connector described above, into an insertion hole 401 of an optical connector 100 that includes a group of lenses 201 disposed in a juxtaposed relationship on a front face of the optical connector 100 and in which the insertion hole 401 is provided so as to extend from an end face (rear face) of the optical connector 100 at the opposite side to the front face toward the group of lenses 201, an optical waveguide sheet 101 is inserted in a direction of optical paths 601. In a state in which the optical waveguide sheet 101 is inserted in the insertion hole 401, through an position adjustment groove 202 passing through up to the insertion hole 401 provided in the optical connector 100, the optical waveguide sheet 101 inserted in the insertion hole 401 is pressed at a side end portion thereof at least from one side along a disposition direction in which the group of lenses 201 are disposed. Therefore, the position of a tip end of the optical paths 601 of the optical waveguide sheet 101 with respect to the group of lenses 201 is adjusted.

Since stabilized positioning is performed, characteristic degradation may be moderated and the yield may be improved. In the optical connector and the fabrication method for the optical connector described above, the tolerance for the optical waveguide sheet 101 or the optical connector 100 is not set severely, and therefore, reduction in cost of the components may be achieved.

According to the fabrication method for the optical connector described above, a holding jig 1002 is abutted with one of side end portions of the optical waveguide sheet 101 through one of the position adjustment grooves 202 at one side of a direction along the disposition direction of the group of lenses 201, and the other one of the side end portions of the optical waveguide sheet 101 is pressed through the other one of the position adjustment grooves 202 from the other side of the direction along the disposition direction of the group of lenses 201. The position of the tip end of the optical paths 601 of the optical waveguide sheet 101 with respect to the group of lenses 201 is adjusted utilizing elastic force exerted by the spring mechanism 1004 abutted by the holding jig 1002. Therefore, efficient and highly accurate adjustment may be performed.

In the fabrication method for the optical connector described above, in the state in which the optical waveguide sheet 101 is inserted in the insertion hole 401, the optical waveguide sheet 101 inserted in the insertion hole 401 is pressed, using an warping correction member 501, from one side of a direction perpendicular to the disposition direction of the group of lenses 201 through a warping correction member insertion hole 203 that is provided on the optical connector 100 and passes through up to the insertion hole 401. Since the position of the tip end of the optical paths 601 of the optical waveguide sheet 101 with respect to the group of lenses 201 is adjusted, warping of the tip end portion of the optical waveguide sheet 101 may be corrected.

In the fabrication method for the optical connector described above, the adjustment in the direction along the disposition direction of the group of lenses 201 is performed after the adjustment in the direction perpendicular to the disposition direction of the group of lenses 201 in which the warping correction member 501 is used is performed. After the warping of the optical waveguide sheet 101 is corrected, the displacement between the group of lenses 201 and the optical paths 601 in the direction along the disposition direction of the group of lenses 201 may be adjusted.

According to the fabrication method for the optical connector described above, after the adjustment, the optical waveguide sheet 101 is fixed to the optical connector 100 by fixing the warping correction member 501 to the optical connector 100. Therefore, characteristic degradation may be moderated and the optical connector 100 may be fabricated with good yield.

The optical connector described above includes a group of lenses 201 disposed in a juxtaposed relationship on a front face of the optical connector, an insertion hole 401, which is provided from a rear face of the optical connector 100 toward the group of lenses 201 and to which an optical waveguide sheet 101 is inserted in a direction of an optical paths 601 of the optical waveguide sheet 101, and an adjustment unit configured to adjust, in a state in which the optical waveguide sheet 101 is inserted in the insertion hole 401, a position of a tip end of the optical paths 601 of the optical waveguide sheet 101 with respect to the group of lenses 201. The adjustment unit may include a first adjustment portion configured to adjust the position of the tip end of the optical paths 601 of the optical waveguide sheet 101 along the direction in which the group of lenses 201 are disposed.

The first adjustment portion has a position adjustment groove 202 passing through to the insertion hole 401. A side end portion of the optical waveguide sheet 101 inserted in the insertion hole 401 is pressed from at least one side in a direction in which the group of lenses 201 is disposed, through the position adjustment groove 202 to adjust the position of the tip end of the optical paths 601 of the optical waveguide sheet 101. The optical axis displacement in a horizontal direction of the optical waveguide sheet 101 may be adjusted efficiently and accurately.

The adjustment unit may include a second adjustment portion configured to adjust the position of the tip end of the optical paths 601 of the optical waveguide sheet 101 in a direction substantially perpendicular to the direction in which the group of lenses 201 is disposed. The second adjustment portion has a warping correction member insertion hole 203 passing through to the insertion hole 401, and a warping correction member 501. The warping correction member 501 adjusts the position of the tip end of the optical paths 601 of the optical waveguide sheet 101 by pressing the optical waveguide sheet 101 inserted in the insertion hole 401 from one side of the direction perpendicular to the insertion direction of the optical waveguide sheet 101 through the warping correction member insertion hole 203. The warping in a horizontal direction of the optical waveguide sheet may be corrected, and efficient and accurate adjustment of the optical axis displacement may be performed.

Upon insertion (before fixing by bonding) of the optical waveguide sheet 101, preferably the optical loss is checked. However, if the optical waveguide sheet 101 is not fixed by bonding, then the position of the optical waveguide sheet 101 in the insertion hole 401 is not stabilized, and therefore, measurement of the loss may be difficult. Even if miscoupling is found after fixing by bolding, since the miscoupling is not repaired, the product that is defective in terms of loss may be discarded and the yield may be degraded. In the fabrication method for an optical connector and the optical connector described above, the problems may be reduced and the yield may be improved.

Since the processing accuracy of the size of the opening of the insertion hole 401 and the size (thickness, width) of the optical waveguide sheet 101 is improved, the mating accuracy of the insertion hole 401 and the optical waveguide sheet 101 may be improved and the displacement amount upon mounting may be reduced. For example, if the gap of the optical waveguide sheet 101 with respect to the insertion hole 401 is small, the optical waveguide sheet 101 may be damaged by friction upon insertion or, upon insertion for abutting, the optical waveguide sheet 101 may not be inserted to the depth. The mating of the members may be predicted from inspection data. Individual inspection may be performed and the yield may be dropped by failure in size, resulting in increase of the cost. With the fabrication method for an optical connector and the optical connector described above, the problems in the fabrication method may be reduced and the fabrication may be made more efficient, and reduction of the cost may be achieved.

Figure 11:
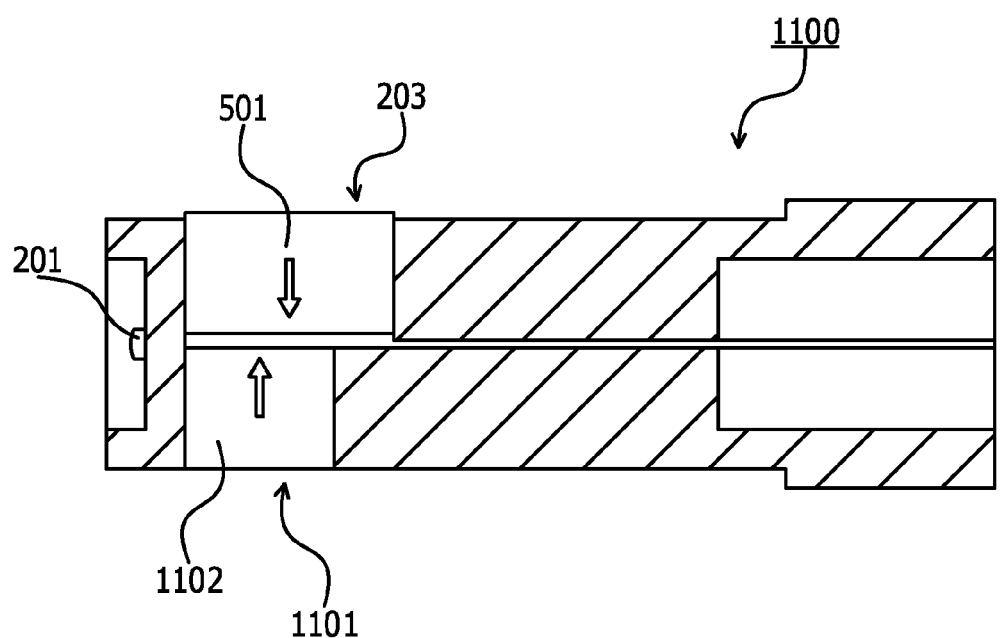
FIG. 11 depicts an example of an optical connector.

FIG. 11 depicts an example of an optical connector. In FIG. 11, a cross sectional view of the optical connector taken along line X-X' depicted in FIG. 2 is depicted. In the optical connector 1100 depicted in FIG. 11, a warping correction member insertion hole 203 is provided in the proximity of the deepest portion of the insertion hole 401 so as to extend from an upper face of the optical connector 1100 to the insertion hole 401. A warping correction member 501 is inserted in the warping correction member insertion hole 203. Separately from the warping correction member insertion hole 203, another warping correction member insertion hole 1101 is provided in the proximity of the deepest portion of the insertion hole 401 so as to extend from a bottom face of the optical connector 1100 to the insertion hole 401.

As depicted in FIG. 11, the warping correction member insertion hole 203 and the warping correction member insertion hole 1101 are disposed in an opposing relationship to each other across the insertion hole 401. Another warping correction member 1102 is inserted in the warping correction member insertion hole 1101.

Warping of a tip end portion of the optical waveguide sheet 101 may be corrected by sandwiching from above and below the tip end portion of the optical waveguide sheet 101 by the warping correction member 501 and the warping correction member 1102. In FIG. 11, the configuration of the other part of the optical connector 1100 may be substantially same as or similar to the configuration depicted in FIG. 2.

The shape and the size of the warping correction member insertion hole 1101 are not limited to the shape and size depicted in FIG. 11 but may be determined arbitrarily. The shape of the warping correction member insertion hole 1101 may be a rectangular shape or some other shape. Also the size of the warping correction member insertion hole 1101 may be greater or smaller than the size depicted in FIG. 11. The warping correction member insertion hole 1101 may extend to at least one of the front face and the rear face of the optical connector 1100 similarly to the warping correction member insertion hole 203.

In FIG. 11, the size of the warping correction member insertion hole 1101 is smaller than the size of the warping correction member insertion hole 203. The warping correction member insertion hole 1101 may otherwise have a substantially same shape or a substantially same size as the shape or the size of the warping correction member insertion hole 203 or may have a size greater than the size of the warping correction member insertion hole 203. The warping correction member insertion hole 1101 and the warping correction member insertion hole 203 may have shapes different from each other.

The warping correction member 1102 may have a shape substantially the same as the shape of the warping correction member insertion hole 1101 and besides may have a size a little smaller than the size of the warping correction member insertion hole 1101. The relationship between the warping correction member 1102 and the warping correction member insertion hole 1101 may be substantially the same as the relationship between the warping correction member 501 and the warping correction member insertion hole 203. The warping correction member 1102 may include a material such as cyclo-olefin polymer or the like similarly to the warping correction member 501. Also the warping correction member 1102 may be fabricated from a material the same as the material of the optical connector 100 similarly to the warping correction member 501. The warping correction member 1102 may be fabricated from a material different from the materials of the warping correction member 501 and the optical connector 100.

The movement of the warping correction member 1102 in the upward and downward directions may be performed using a given adjustment apparatus or may be performed manually by a worker. Thereupon, in an interlocking relationship with the movement of the warping correction member 501 in the upward and downward directions, the pressing force of the warping correction member 1102 and the warping correction member 501 is adjusted and damage to the optical waveguide sheet 101 may be reduced.

In the optical connector 1100 depicted in FIG. 11, since the optical waveguide sheet 101 is sandwiched from above and below, warping of a tip end portion of the optical waveguide sheet 101 is corrected with certainty, and movement of the tip end portion to an appropriate position is performed. For example, a case where the thickness of the optical waveguide sheet 101 has a dispersion may be also handled.

Figure 12:
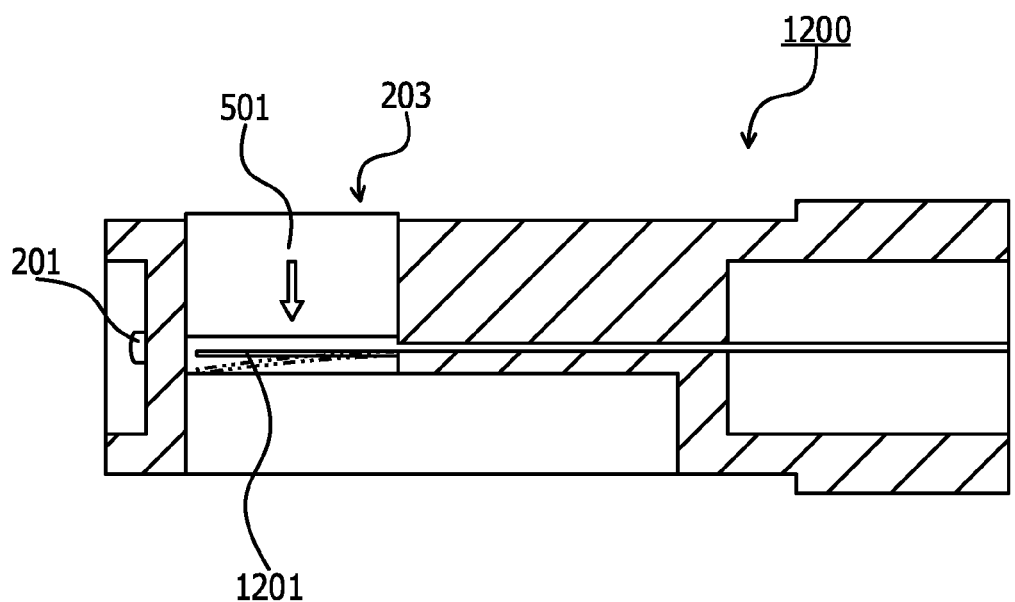
FIG. 12 depicts an example of an optical connector.

FIG. 12 depicts an example of an optical connector. In FIG. 12, a cross sectional view of the optical connector taken along line X-X' depicted in FIG. 2 is depicted. In the optical connector 1200 depicted in FIG. 12, a warping correction member insertion hole 203 is provided in the proximity of the deepest portion of the insertion hole 401 so as to extend from an upper face of the optical connector 1200 to the insertion hole 401. A warping correction member 501 is inserted in the warping correction member insertion hole 203. An elastic member 1201 is provided at the lower side of the insertion hole 401. The elastic member 1201 may be, for example, a leaf spring and may be provided such that a portion thereof in the proximity of the deepest portion of the insertion hole 401 is deflected.

If the warping correction member 501 is pressed to the lower side, the elastic member 1201 at the lower side of the optical waveguide sheet 101 is deflected and moved to the lower side together with the inserted optical waveguide sheet 101. Warping of the optical waveguide sheet 101 is moderated by antagonism with the repulsive force of the elastic member 1201. Even if the thickness of the optical waveguide sheet 101 has a dispersion, the optical waveguide sheet 101 is moved to an optimum position (reference height). In FIG. 12, the configuration of the other part of the optical connector 1200 may be substantially the same as or similar to the configuration depicted in FIG. 2. After the adjustment, the elastic member 1201 may be fixed by bonding to the optical connector 1200 using, for example, UV bonding agent in the form of liquid so that the elastic member 1201 may not move later.

The elastic member 1201 may be a leaf spring. For example, if a portion at the lower side of the insertion hole 401 is formed from an elastic member having elasticity such as rubber, an effect similar to the effect achieved where a leaf spring is utilized may be achieved.

In the optical connector 1200 depicted in FIG. 12 and a fabrication method of an optical connector, correction of warping and adjustment of the reference height of the optical waveguide sheet 101 are performed substantially simultaneously utilizing the elastic force of the elastic member 1201. For example, by utilizing the repulsive force which is generated by applying pressure to the warping correction member 501 to press down the optical waveguide sheet 101 to the lower side, adjustment of the reference height of the optical waveguide sheet 101 and correct warping of the optical waveguide sheet 101 may be performed.

Figure 13:
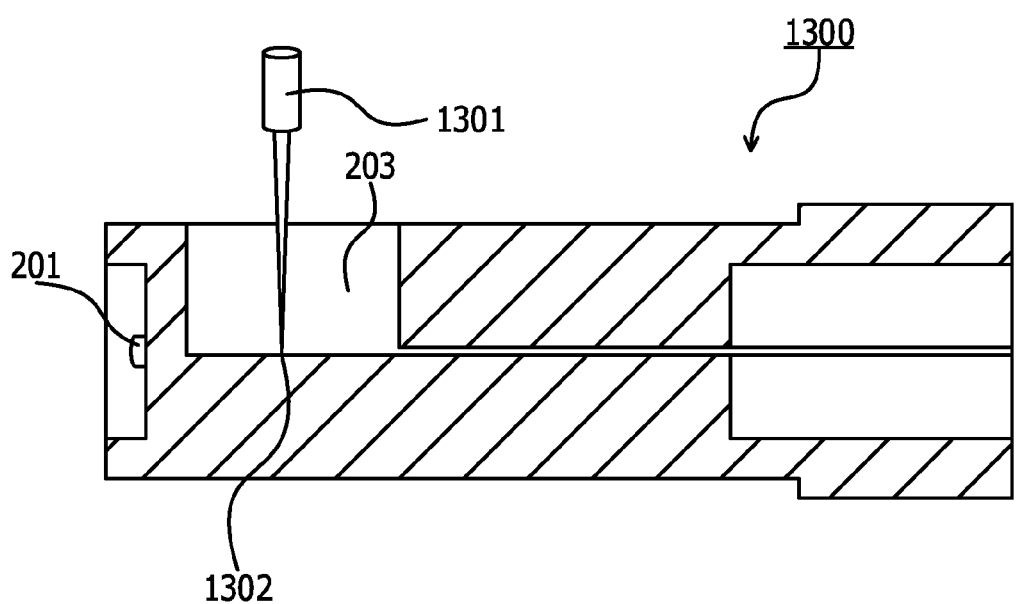
FIG. 13 depicts an example of an optical connector.

FIG. 13 depicts an example of an optical connector. In FIG. 13, a cross sectional view of the optical connector taken along line X-X' depicted in FIG. 2 is depicted. In FIG. 13, for example, a laser generation apparatus or an ink jet printer denoted by reference numeral 1301 may be provided. In order to adjust the displacement in height between the group of lenses 201 and the optical paths 601 by adjusting the height of a reference face 1302 for the optical waveguide sheet 101, for example, the height of a lower side portion of the insertion hole 401 corresponding to a warping correction member insertion hole 203, the laser generation apparatus or ink jet printer 1301 may be used. For example, if the reference face 1302 is excessively high, a cutting process using the laser generation apparatus 1301 is performed. If the reference face 1302 is excessively low, a modeling process is performed by the ink jet printer 1301. In FIG. 13, the configuration of the other part of the optical connector 1300 may be substantially the same as or similar to the configuration depicted in FIG. 2.

According to the optical connector 1300 depicted in FIG. 13 and a fabrication method for an optical connector, adjustment of the reference face 1302 may be performed with certainty. For example, even if the thickness of the optical waveguide sheet 101 has a variation caused by a dispersion in the fabrication process of the optical waveguide sheet 101, adjustment of the height of the reference face may be performed readily, and displacement after the completion may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A fabrication method for an optical connector, comprising:
    inserting an optical waveguide sheet, in a direction of an optical path of the optical waveguide sheet, into an insertion hole of an optical connector including a group of lenses disposed in a juxtaposed relationship on a first end face of the optical connector, the insertion hole extending from a second end face of the optical connector at an opposite side to the first end face toward the group of lenses; and
    performing first adjustment of adjusting a position of a tip end of the optical path with respect to the group of lenses by pressing a side end portion of the optical waveguide sheet inserted in the insertion hole from at least one of sides of a first direction along a disposition direction of the group of lenses, through a first hole portion that is provided in the optical connector and extends to the insertion hole.

2. The fabrication method for an optical connector according to claim 1, further comprising,
    abutting an abutting member with one side of the side end portion of the optical waveguide sheet through one hole of the first hole portion at one of the sides of the first direction,
    wherein the other side of the side end portion of the optical waveguide sheet is pressed through the other hole of the first hole portion from the other of the sides of the first direction.

3. The fabrication method for an optical connector according to claim 2, wherein the position of the tip end of the optical path with respect to the group of lenses is adjusted by utilizing an elastic force of the abutment member.

4. The fabrication method for an optical connector according to claim 1, further comprising:
    performing second adjustment of adjusting the position of the tip end of the optical path with respect to the group of lenses by pressing, using an adjustment member, the optical waveguide sheet inserted in the insertion hole from at least one of sides of a second direction perpendicular to the disposition direction through a second hole portion that is provided on the optical connector and extends to the insertion hole.

5. The fabrication method for an optical connector according to claim 4, wherein the first adjustment is performed after the second adjustment is performed.

6. The fabrication method for an optical connector according to claim 4, further comprising,
    fixing, after the second adjustment, the optical waveguide sheet to the optical connector by fixing the adjustment member to the optical connector.

7. An optical connector, comprising:
    a group of lenses disposed in a juxtaposed relationship in a first direction on a first end face of the optical connector;
    an insertion hole, provided from a second end face of the optical connector at an opposite side to the first end face toward the group of lenses, configured to be inserted an optical waveguide sheet in a direction of an optical path of the optical waveguide sheet; and an adjustment element configured to adjust, in a state in which the optical waveguide sheet is inserted in the insertion hole, a position of a tip end of the optical path with respect to the group of lenses, wherein the adjustment element includes a first adjustment portion configured to adjust the position of the tip end of the optical path along the first direction, and the first adjustment portion includes a first hole portion extending to the insertion hole in the first direction.

8. The optical connector according to claim 7, wherein the position of the tip end of the optical path is adjusted by pressing a side end portion of the optical waveguide sheet inserted in the insertion hole from at least one of sides in a direction along the first direction through the first hole portion.

9. The optical connector according to claim 7, wherein the adjustment element includes a second adjustment portion configured to adjust the position of the tip end of the optical path in a second direction substantially perpendicular to the direction in which the group of lenses is disposed.

10. The optical connector according to claim 9, wherein the second adjustment portion has a second hole portion extending to the insertion hole in the second direction.

11. The optical connector according to claim 9, further comprising:

an adjustment member configured to adjust the position of the tip end of the optical path by pressing the optical waveguide sheet inserted in the insertion hole from at least one of sides of the second direction through the second hole portion.

12. The optical connector according to claim 7, further comprising:

an elastic member provided at a side of the group of lenses in the insertion hole and having a tip end that is deflected in a second direction substantially perpendicular to the direction in which the group of lenses is disposed.

13. An optical connector, comprising:

a group of lenses disposed in a juxtaposed relationship in a first direction on a first end face of the optical connector;

an insertion hole, provided from a second end face of the optical connector at an opposite side to the first end face toward the group of lenses, configured to be inserted an optical waveguide sheet in a direction of an optical path of the optical waveguide sheet; and an adjustment element configured to adjust, in a state in which the optical waveguide sheet is inserted in the insertion hole, a position of a tip end of the optical path with respect to the group of lenses, wherein the adjustment element includes an adjustment portion configured to adjust the position of the tip end of the optical path in a second direction substantially perpendicular to the direction in which the group of lenses is disposed, and the adjustment portion has a hole portion extending to the insertion hole in the second direction.

14. The optical connector according to claim 13, further comprising:

an adjustment member configured to adjust the position of the tip end of the optical path by pressing the optical waveguide sheet inserted in the insertion hole from at least one of sides of the second direction through the hole portion.

15. The optical connector according to claim 13, further comprising:

an elastic member provided at a side of the group of lenses in the insertion hole and having a tip end that is deflected in the second direction substantially perpendicular to the direction in which the group of lenses is disposed.

* * * * *